(12) United States Patent
Turgay

(10) Patent No.: US 9,596,418 B2
(45) Date of Patent: Mar. 14, 2017

(54) SYSTEM AND METHOD FOR FOCUSING AN ELECTRONIC IMAGING SYSTEM

(75) Inventor: Emre Turgay, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 265 days.

(21) Appl. No.: 14/239,544

(22) PCT Filed: Feb. 2, 2012

(86) PCT No.: PCT/IB2012/050487
§ 371 (c)(1),
(2), (4) Date: Feb. 19, 2014

(87) PCT Pub. No.: WO2013/114160
PCT Pub. Date: Aug. 8, 2013

(65) Prior Publication Data
US 2014/0192203 A1     Jul. 10, 2014

(51) Int. Cl.
| | | |
|---|---|---|
| G06K 9/34 | (2006.01) | |
| G03B 13/00 | (2006.01) | |
| G03B 13/18 | (2006.01) | |
| G03B 13/20 | (2006.01) | |
| H04N 5/33 | (2006.01) | |
| H04N 5/232 | (2006.01) | |

(52) U.S. Cl.
CPC ........... *H04N 5/33* (2013.01); *H04N 5/23212* (2013.01)

(58) Field of Classification Search
None
See application file for complete search history.

(56) References Cited

U.S. PATENT DOCUMENTS

2010/0128144 A1    5/2010    Tay

FOREIGN PATENT DOCUMENTS

| JP | 2002214524 A | * | 7/2002 | ............ H04N 5/232 |
| JP | 2002214524 A | | 7/2002 | |

* cited by examiner

*Primary Examiner* — Dave Czekaj
*Assistant Examiner* — Alison Slater
(74) *Attorney, Agent, or Firm* — Gokalp Bayramoglu

(57) ABSTRACT

The present invention relates to the field of image processing and methodologies to passively focus an image automatically, using the electronic sensor signal. The method comprises steps of; receiving a pixel image, generating at least two histograms of the received image using at least two different frequency components, finding widths of acquired histograms and storing them as a focus measure, finding difference between last received frame's highest frequency component histogram width and at least one previously received frame's histogram width corresponding to the same component, determine whether there is a meaningful difference, and determine the focus direction signal by using the difference. The system comprises; an image sensor to acquire an electronic pixel image; an image processing unit configured to receive an image and implement the method using this image and output a focus direction signal found by the method; and a memory unit configured to store image histogram widths.

3 Claims, 5 Drawing Sheets

SYSTEM AND METHOD FOR FOCUSING AN ELECTRONIC IMAGING SYSTEM

FIELD OF THE INVENTION

The present invention relates to the field of image processing and methodologies to passively focus an image automatically, using the electronic sensor signal.

BACKGROUND OF THE INVENTION

In an imaging system, an object of interest can be seen in focus and with negligible blur by changing the distance between lens and optical sensor accordingly. It is known that there are methods and systems to auto-focus an image. Such methods are used for example in infrared imaging systems (thermal cameras) in which there is a sensor acquiring an infrared image of the scene under consideration and generally these images are converted into a greyscale format. This image consists of a two dimensional array of pixels which represent the infrared intensity at these locations. Because of depth and range requirements of these systems, the depth of field is low and it is required to focus the image repetitively which lowers targeting and surveillance performance if done manually.

Currently, passive focusing is a widely used method, wherein the signal from the electronic image sensor is evaluated and used to drive the lens motion devices which are for example; stepper motors. One of the problems related to the passive methods is that, they require a mathematical function which represents the sharpness of the image. A good function should be monotonically increasing with a maximum at the focus point. There are many such currently used pixel-based functions. For example, the out-of-focus effect can be considered as a low-pass filter and the high frequency component of the image can be investigated to detect focus. A modified Laplace operator or a Tenengrad function is used, which both determine the high frequency component of an image by evaluating directional derivatives at each pixel location.

Another method uses local pixel variance of images which was observed to increase when the image is out-of-focus. Other than these Fourier transform method, total module difference method and histogram entropy method are other known methods to passively detect focus condition.

Another problem related to the automatic focusing systems is the processing power requirements due to the high frame rate and resolution of the infrared vision systems which makes image processing difficult on generic central processing units (CPU) or digital signal processors (DSP). Instead, field programmable gate arrays (FPGA) are used to process the data by parallel processing in much less clock cycles. Currently, many infrared vision systems are equipped both with FPGAs and DSPs which run histogram matching and edge enhancement algorithms on real-time. Current methods are not offering a simple way of focusing an infrared imaging system automatically although they can be used to auto-focus the lens with ease and very little modification using the method proposed.

The Japan patent document JP 3297282, an application in the state of the art, discloses a method for focusing an imaging system automatically by comparing derivatives of two evaluation value received from one low and one high pass filter and accordingly using one of these signals to determine lens position.

The International patent document WO 2010088079, an application in the state of the art, discloses a method for focusing an imaging system automatically using more than one digital band-pass filter which are switched according to local approximations of first and second derivative values.

SUMMARY OF THE INVENTION

An objective of the present invention is to provide an easily implemented methodology to focus an infrared imaging system.

BRIEF DESCRIPTION OF THE DRAWINGS

A system and method realized to fulfil the objective of the present invention is illustrated in the accompanying figures, in which.

Figure 1:
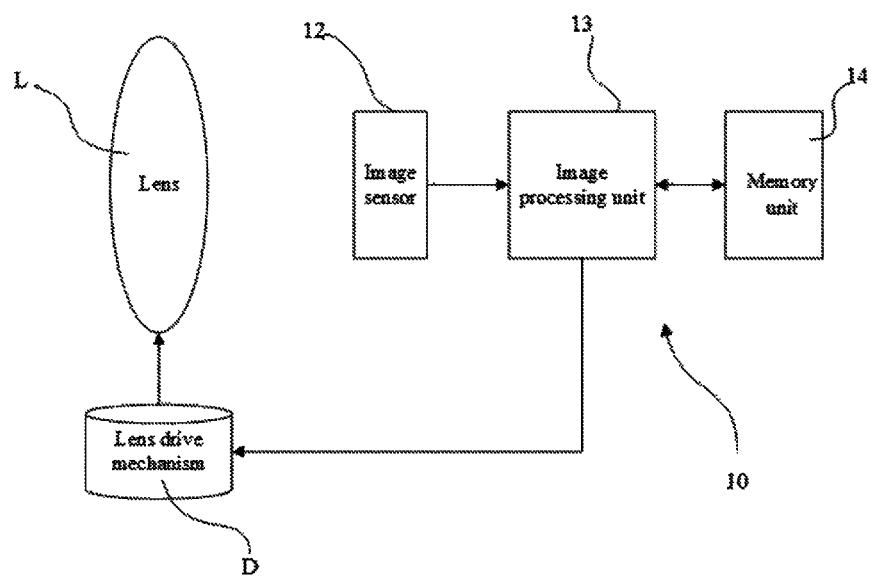
FIG. 1 is the schematic view of the preferred embodiment system.

The components illustrated in the figures are individually numbered where the numbers refer to the following:
1. First modified sharpness step function
2. Second modified sharpness step function
3. Third modified sharpness step function
10. System for focusing an electronic imaging system
12. Image sensor
13. Image processing unit
14. Memory unit
100. Method for focusing an electronic imaging system
L. Lens
D. Lens drive mechanism

DETAILED DESCRIPTION OF THE INVENTION

Figure 2:
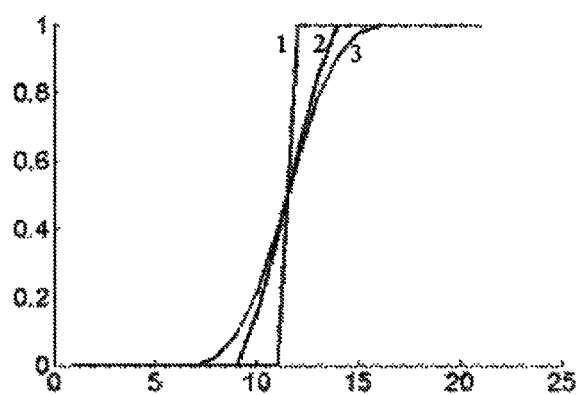
FIG. 2 shows graphs of three one dimensional modified sharpness step functions.
Figure 3:
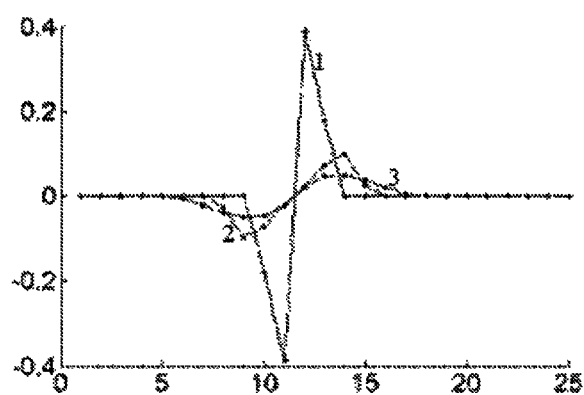
FIG. 3 shows graphs of high frequency components of the one dimensional modified sharpness step functions.
Figure 4:
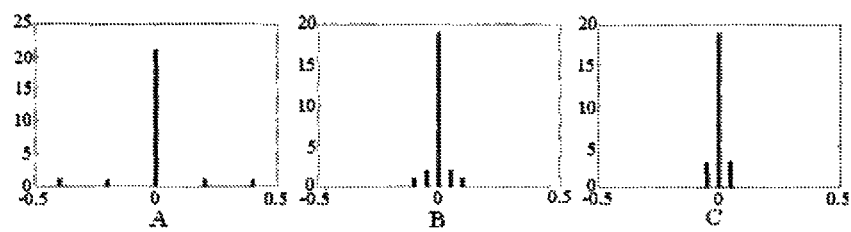
FIG. 4 shows histograms of the high frequency components of the modified step functions. (A, B and C stand for the first, second and third functions respectively)

A method for focusing an electronic imaging system (100) fundamentally comprises the following steps,
- receiving a pixel image (101),
- generating at least two histograms of at least one region of the received image using at least two different frequency components (102),
- finding widths of acquired histograms and storing them as a focus measure (103),
- finding the difference between last received frame's highest frequency component histogram width, which was not previously taken into account, and at least one previously received frame's histogram width corresponding to the same frequency component (104),
- is there a meaningful difference? (105),
- using the difference to determine the focus direction signal (106), First, an image of the scene under consideration is received (101). In the case of a thermal camera system, this will be a two dimensional grey scale pixel image, each pixel representing the infrared density for that location in the scene under consideration. Nevertheless, the main aim of this system is to detect the focusing direction and a means to detect sharpness should be introduced. When the high frequency components of modified step functions are investigated, it is seen that their histogram width is changing as the sharpness of the function (the first modified sharpness step function 1, second modified sharpness step function 2, and third modified sharpness step function 3) changes. Actually the width increases as the step function sharpness increases. Here, histograms represent the distribution of pixels on the image with different values (values on horizontal axis and count on vertical) and histogram width means the scatter of the distribution around the mean value. Analogously, as the image gets out of focus, pixel values at higher frequency components will get clustered around a single value on the histogram. (FIG. 2, FIG. 3, FIG. 4)

Histograms are acquired for at least two different frequency components for a region on the received is calculated in step (102). Then, their widths are calculated by eliminating some of the values on the floor caused by the possible noise in the system and they are stored for further comparison (103). This introduces a noise threshold in a preferred configuration. The width can be found using different methods, for example by finding the intersection of the histogram graph edges with a horizontal line drawn at the noise threshold level and finding the distance in between. Since most of the infrared imaging systems already have means for edge enhancement, contrast adjustment etc., high frequency and low frequency histograms are already being generated continuously and these are used in this method. In a preferred configuration, the lower frequency components of the image are found by subtracting the higher frequency component from the original image.

Knowing that the histogram width will be used as a focus measure, the focus lens is moved to detect the change in the histogram widths. When doing so, initially the highest frequency component's histogram is used since it is assumed that there was some object in focus previously. Last received frame's highest frequency component histogram width and at least one previously received frame's histogram width corresponding to the same frequency component are differentiated to determine focus direction in step (104). And if there is not any meaningful difference (answer of step (105) is no) the histograms with a lower frequency component are differentiated and used as the focus measure. This case occurs when the current position of the focus lens coincides to a point where image is completely out of focus and high frequency histogram is gathered tightly around its mean. A histogram with a wider distribution should be used instead, which is actually the case for a lower frequency component histogram.

This process continues until a meaningful direction is found using the change of the histogram width values. When all of the histograms belonging to every frequency component are used but no meaningful difference is found, a stop signal is generated and method should be reactivated with an input means for the new state of the lens in a preferred configuration. This meaningful difference is a value other than zero in a preferred configuration since this would mean the derivative of the stored histogram width sequence with changing lens position is zero and no direction can be deduced. According to the change in the width of histograms a focus direction is determined and a signal is generated. The focus direction signal is generated to drive the focus assembly in the direction that increases the histogram width.

Figure 5:
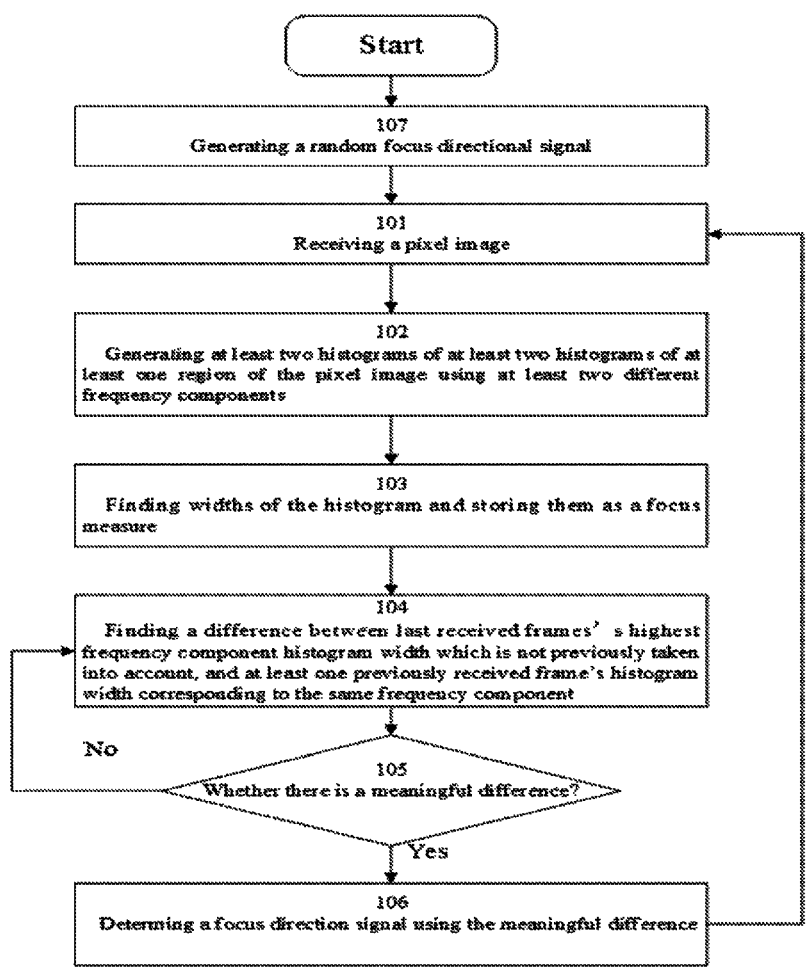
FIG. 5 is the flowchart of the preferred method of the present invention.

To initialize this method an initial movement should be introduced to be able to find a first direction value therefore a random focus direction signal is generated in an additional step (107). (FIG. 5).

In a preferred configuration of the method (100), when there is not any meaningful result after investigating all of the possible frequency component histograms, a stop signal is generated.

A system for focusing an electronic imaging system (10) fundamentally comprises;
at least one image sensor (12) to acquire at least one electronic pixel image of the scene under consideration when necessary,
at least one image processing unit (13) configured to receive at least one image and implement the method for focusing an electronic imaging system (100) using this image and output a focus direction signal found by the method (100),
at least one memory unit (14) connected to the image processing unit and configured to store image histogram widths which are necessary to implement the method for focusing an electronic imaging system (100), In a preferred embodiment of the present invention, image sensor (12) is a scanning infrared vision camera which is able to differentiate temperature differences in the scene. In a preferred embodiment of the present invention, image processing unit (13) is configured to receive at least one image from image sensor (12). Anyone proficient in the image processing field should understand that this system (10) and method (100) is applied on a sequence of pixel images and focus status can be continuously monitored. Image processing unit (13) is configured to transmit a signal to a lens drive mechanism (D) which locates the lens (L) according to the signal produced by the image processing unit (13).

The found histogram widths corresponding to the previous frames are stored in memory unit (14) which is connected to image processing unit (13). In conclusion, by starting the lens movement in a random direction, comparing present histogram's widths and deciding on focus direction, an easily implemented methodology and system is obtained. (FIG. 1).

Within the scope of these basic concepts, it is possible to develop a wide variety of embodiments of the inventive "system and method for focusing an electronic imaging system" (10), (100). The invention cannot be limited to the examples described herein; it is essentially according to the claims.

The invention claimed is:
1. A method for focusing an electronic imaging system, the method comprising the steps of:
S1: pre-focusing an object;
S2: receiving a first pixel image;
S3: generating at least two first histograms of at least one region of the first pixel image using at least two different frequency components;
S4: finding widths of the at least two first histograms and storing them as a first focus measure;
S5: moving a focus lens;
S6: receiving a second pixel image;
S7: generating at least two second histograms of at least one region of the second pixel image using the at least two different frequency components;
S8: finding widths of the at least two second histograms and storing them as a second focus measure;
S9: finding a difference between the second pixel image's high frequency component histogram width and the first pixel image's high frequency component histogram width;

S10: determining whether there is a difference, wherein the difference is other than zero; and S11: determining a focus direction signal using the higher frequency component histogram widths as the focus measures if there is a difference other than zero, otherwise using the lower frequency component histogram widths as the focus measures.

2. The method for focusing an electronic imaging system according to claim 1, wherein the first histogram with the lower frequency component and the second histogram with the lower frequency component are differentiated if there is no difference in step S10.

3. A system for focusing an electronic imaging system, comprising:

at least one image sensor which is capable of acquiring at least one electronic pixel image;

at least one image processing unit which is capable of:
receiving at least one image from the image sensor,
generating at least two histograms in at least one region of the image by using at least two frequency components, wherein the two frequency components comprise a high frequency component and a lower frequency component,
finding a first high frequency component histogram width of a last received frame;
finding a second high frequency component histogram width of a previously received frame;
storing the first high frequency component histogram width of the last received frame as a first focus measure; and
storing the second high frequency component histogram width of the previously received frame as a second focus measure;
finding a difference between the first high frequency component histogram width of the last received frame, which is not previously taken into account, and the second high frequency component histogram width of the previously received frame,
questioning the difference between the two histogram widths and determining a focus direction signal according to the result of this query, and
transmitting the determined focus direction signal to a lens drive mechanism; and at least one memory unit which is capable of connecting to the image processing unit and storing image histogram widths which are accessed by the image processing unit to determine the focus direction signal in order to determine a focus direction signal output for focusing the electronic imaging system.

* * * * *